United States Patent
Kwon et al.

(10) Patent No.: US 9,585,171 B2
(45) Date of Patent: Feb. 28, 2017

(54) SYSTEM AND METHOD FOR ONE-WAY TRAFFIC IN WIRELESS COMMUNICATIONS SYSTEMS

(71) Applicant: Futurewei Technologies, Inc., Plano, TX (US)

(72) Inventors: Young Hoon Kwon, San Diego, CA (US); Zhigang Rong, San Diego, CA (US); Yunsong Yang, San Diego, CA (US); Zhenguo Du, Shenzhen (CN)

(73) Assignee: Futurewei Technologies, Inc., Plano, TX (US)

(*) Notice: Subject to any disclaimer, the term of this patent is extended or adjusted under 35 U.S.C. 154(b) by 379 days.

(21) Appl. No.: 14/318,236

(22) Filed: Jun. 27, 2014

(65) Prior Publication Data

US 2015/0078356 A1 Mar. 19, 2015

Related U.S. Application Data

(60) Provisional application No. 61/877,323, filed on Sep. 13, 2013.

(51) Int. Cl.
*H04B 7/212* (2006.01)
*H04W 74/08* (2009.01)
(Continued)

(52) U.S. Cl.
CPC ....... *H04W 74/0816* (2013.01); *H04L 1/1685* (2013.01); *H04L 1/1854* (2013.01); *H04L 1/1607* (2013.01); *H04W 84/12* (2013.01)

(58) Field of Classification Search
CPC .......................... H04W 74/0816; H04W 28/12
(Continued)

(56) References Cited

U.S. PATENT DOCUMENTS 7,693,175 B1 * 4/2010 Benveniste ......... H04W 74/002
                                                            370/338
9,369,918 B2 * 6/2016 Grandhi ................ H04W 28/06
(Continued)

FOREIGN PATENT DOCUMENTS

CN          102598803 A       7/2012
CN          102687422 A       9/2012

OTHER PUBLICATIONS

International Search Report of Patent Cooperation Treaty (PCT), International Application No. PCT/CN2014/086473, Applicant Huawei Technologies Co., Ltd, date of mailing Dec. 23, 2014, 11 pages.

(Continued)

*Primary Examiner* — Ricky Ngo
*Assistant Examiner* — Dewanda Samuel
(74) *Attorney, Agent, or Firm* — Slater Matsil, LLP

(57) ABSTRACT

A method for operating a sharing station includes receiving, by the sharing station, a request to send (RTS) frame on a wireless channel, wherein the RTS frame is not addressed to the sharing station, and wherein the RTS frame including a transmit only indicator indicating that a transmitting station of the RTS frame will only transmit frames without receiving frames until expiration of a first time value in a first duration field of the RTS frame. The method also includes determining, by the sharing station, if a clear to send (CTS) frame corresponding to the RTS frame is received within a specified time period after receiving the RTS frame, and transmitting, by the sharing station, a frame when the CTS frame corresponding to the RTS frame is not received within the specified time period.

20 Claims, 14 Drawing Sheets

(51) Int. Cl.
*H04L 1/18* (2006.01)
*H04W 84/12* (2009.01)
*H04L 1/16* (2006.01)

(58) Field of Classification Search
USPC .......................................... 370/338, 252, 328
See application file for complete search history.

(56) References Cited

U.S. PATENT DOCUMENTS

| | | | | |
|---|---|---|---|---|
| 2005/0089057 | A1* | 4/2005 | Kang | H04W 74/0816 370/445 |
| 2006/0114867 | A1* | 6/2006 | Du | H04W 74/002 370/338 |
| 2007/0042797 | A1 | 2/2007 | Lee et al. | |
| 2007/0160021 | A1* | 7/2007 | Xhafa | H04W 74/04 370/338 |
| 2008/0002615 | A1* | 1/2008 | Nakajima | H04L 1/1614 370/328 |
| 2010/0074198 | A1 | 3/2010 | Morioka | |
| 2010/0238807 | A1* | 9/2010 | Xhafa | H04W 72/1215 370/241 |
| 2011/0064013 | A1* | 3/2011 | Liu | H04W 74/0816 370/312 |
| 2011/0103280 | A1 | 5/2011 | Liu et al. | |
| 2011/0222408 | A1 | 9/2011 | Kasslin et al. | |
| 2013/0294289 | A1* | 11/2013 | Kneckt | H04W 72/082 370/254 |
| 2013/0294360 | A1* | 11/2013 | Yang | H04W 24/02 370/329 |
| 2014/0119288 | A1* | 5/2014 | Zhu | H04W 74/0816 370/329 |
| 2014/0169357 | A1 | 6/2014 | Noh et al. | |
| 2014/0334387 | A1* | 11/2014 | Doppler | H04W 74/0816 370/329 |

OTHER PUBLICATIONS

"IEEE Standard for Information technology—Telecommunications and information exchange between systems Local and metropolitan area networks—Specific requirements, Part 11: Wireless LAN Medium Access Control (MAC) and Physical Layer (PHY) Specifications," IEEE Std. 802.11tm-2012 (Revision of IEEE Std. 802.11-2007), IEEE Computer Society Sponsored by the LAN/MAN Standards Committee, Mar. 29, 2012, 2793 pges.

* cited by examiner

SYSTEM AND METHOD FOR ONE-WAY TRAFFIC IN WIRELESS COMMUNICATIONS SYSTEMS

This application claims the benefit of U.S. Provisional Application No. 61/877,323, filed on Sep. 13, 2013, entitled "System and Method for One-Way Traffic in Wireless Communications Systems," which application is hereby incorporated herein by reference.

TECHNICAL FIELD

The present invention relates to digital communications, and, in particular embodiments, to one-way traffic in wireless communications systems.

BACKGROUND

The number of devices using Wireless Local Area Networks (WLAN) continues to show dramatic growth. WLANs allow users the ability to connect to high-speed services without being tethered to wireline connections. WLANs are wireless communications systems that are based on the IEEE 802.11 series of technical standards. Typically, as the number of devices using WLANs increases, it is expected that a given wireless channel will become more crowded, resulting in a decrease in channel efficiency of the wireless channel due to the occurrence of more collisions.

A newly formed IEEE 802.11 Study Group named "High Efficiency WLAN (HEW)" has been formed to study, among other things, techniques on how to avoid collisions and improve channel efficiency in highly crowded environment.

SUMMARY

Example embodiments of the present disclosure which provide a system and method for one-way traffic in wireless communications systems.

In accordance with an example embodiment of the present disclosure, a method for operating a sharing station is provided. The method includes receiving, by the sharing station, a request to send (RTS) frame on a wireless channel, wherein the RTS frame is not addressed to the sharing station, and wherein the RTS frame including a transmit only indicator indicating that a transmitting station of the RTS frame will only transmit frames without receiving frames until expiration of a first time value in a first duration field of the RTS frame. The method also includes determining, by the sharing station, if a clear to send (CTS) frame corresponding to the RTS frame is received within a specified time period after receiving the RTS frame, and transmitting, by the sharing station, a frame when the CTS frame corresponding to the RTS frame is not received within the specified time period.

In accordance with another example embodiment of the present disclosure, a method for operating a receiving station is provided. The method includes receiving, by the receiving station, a request to send (RTS) frame on a wireless channel, wherein the RTS frame is addressed to the receiving station, and wherein the RTS frame including a transmit only indicator indicating that a transmitting station of the RTS frame will only transmit frames without receiving frames until expiration of a first time value in a first duration field of the RTS frame, and transmitting, by the receiving station, a clear to send (CTS) frame on the wireless channel. The method also includes receiving, by the receiving station, a plurality of frames from the transmitting station of the RTS frame prior to expiration of the first time value in the first duration field of the RTS frame, and receiving, by the receiving station, a block acknowledgement request frame from the transmitting station after expiration of the first time value in the first duration field of the RTS frame. The method further includes transmitting, by the receiving station, a block acknowledgement frame to the transmitting station, the block acknowledgement frame reflective of decoding attempts of the plurality of frames.

In accordance with another example embodiment of the present disclosure, a method for operating a transmitting station is provided. The method includes transmitting, by the transmitting station, a request to send (RTS) frame on a wireless channel, wherein the RTS frame is addressed to a receiving station, and wherein the RTS frame including a transmit only indicator indicating that the transmitting station will only transmit frames without receiving frames until expiration of a first time value in a first duration field of the RTS frame, and receiving, by the transmitting station, a clear to send (CTS) frame from the receiving station. The method also includes transmitting, by the transmitting station, a plurality of frames prior to expiration of the first time value in the first duration field of the RTS frame, and transmitting, by the transmitting station, a block acknowledgement request frame after expiration of the first time value in the first duration field of the RTS frame. The method also includes receiving, by the transmitting station, a block acknowledgement frame from the receiving station, the block acknowledgement frame reflective of decoding attempts of the plurality of frames by the receiving station.

In accordance with another example embodiment of the present disclosure, a sharing station is provided. The sharing station includes a receiver, a processor operatively coupled to the receiver, and a transmitter operatively coupled to the processor. The receiver receives a request to send (RTS) frame on a wireless channel, where the RTS frame is not addressed to the sharing station, and wherein the RTS frame including a transmit only indicator indicating that a transmitting station of the RTS frame will only transmit frames without receiving frames until expiration of a first time value in a first duration field of the RTS frame. The processor determines if a clear to send (CTS) frame corresponding to the RTS frame is received within a specified time period after receiving the RTS frame. The transmitter transmits a frame when the CTS frame corresponding to the RTS frame is not received within the specified time period.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
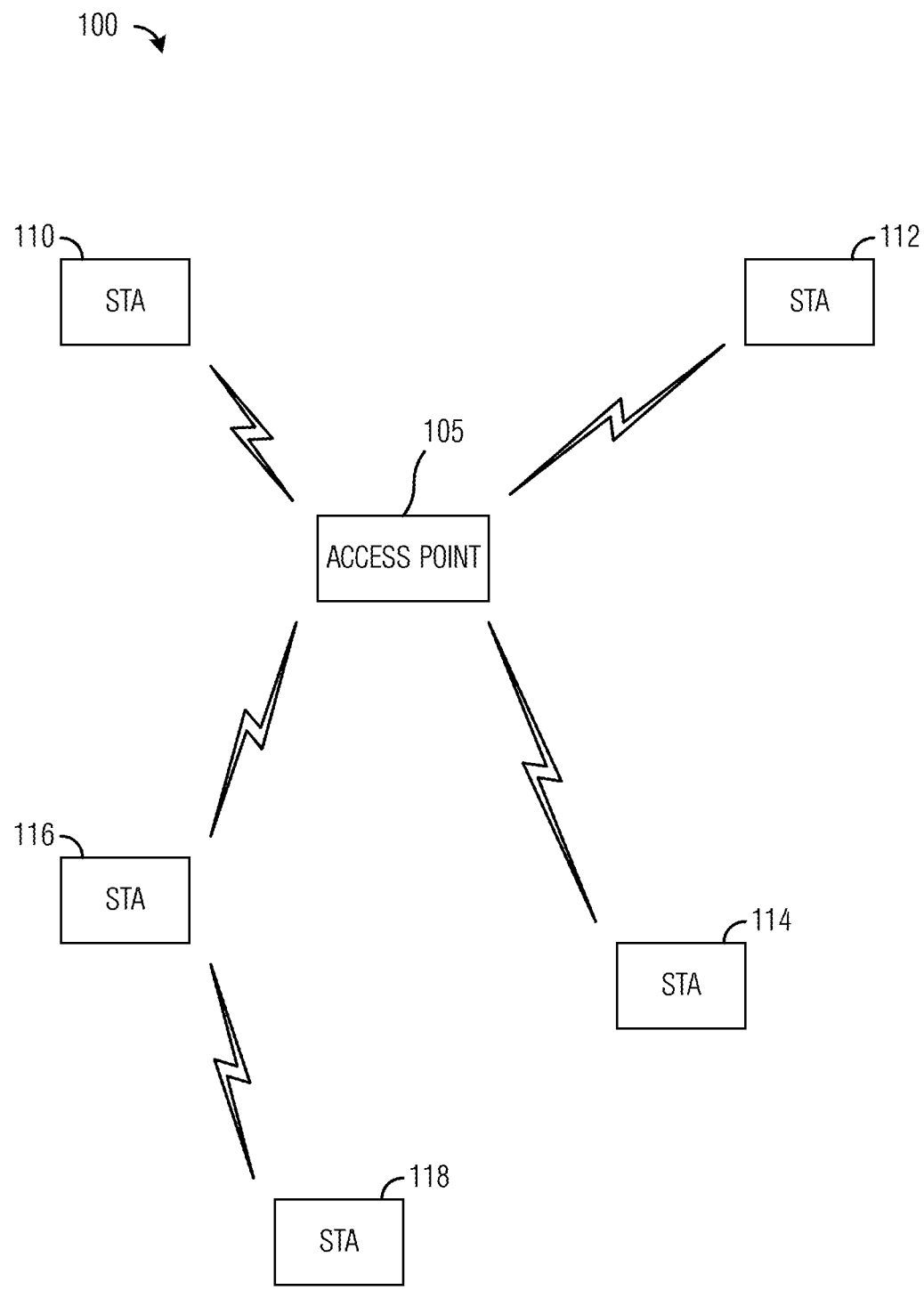
FIG. 1 illustrates an example wireless communications system in accordance with an embodiment.

FIG. 1 illustrates an example wireless communications system 100. Wireless communications system 100 includes an access point (AP) 105 that serves one or more stations, such as stations (STA) 110-116, by receiving communications originating from the stations and then forwarding the communications to their intended destinations or receiving communications destined to the stations and then forwarding the communications to their intended stations. In addition to communicating through AP 105, some stations may directly communicate with one another. As an illustrative example, station 116 may transmit directly to station 118.

Transmissions to and/or from a station occur on a shared wireless channel. WLANs make use of carrier sense multiple access with collision avoidance (CSMA/CA), where a station desiring to transmit needs to contend for access to the wireless channel before it can transmit. A station may contend for access to the wireless channel using a network allocation vector (NAV). The NAV may be set to a first value to represent that the wireless channel is busy and to a second value to represent that the wireless channel is idle. The NAV may be set by station in accordance with physical carrier sensing and/or reception of transmissions from other stations and/or APs. Therefore, contending for access to the wireless channel may require the station to expend a significant amount of time, thereby decreasing wireless channel utilization and overall efficiency. Furthermore, contending for access to the wireless channel may become difficult if not impossible as the number of stations contending for access increases.

Figure 2:
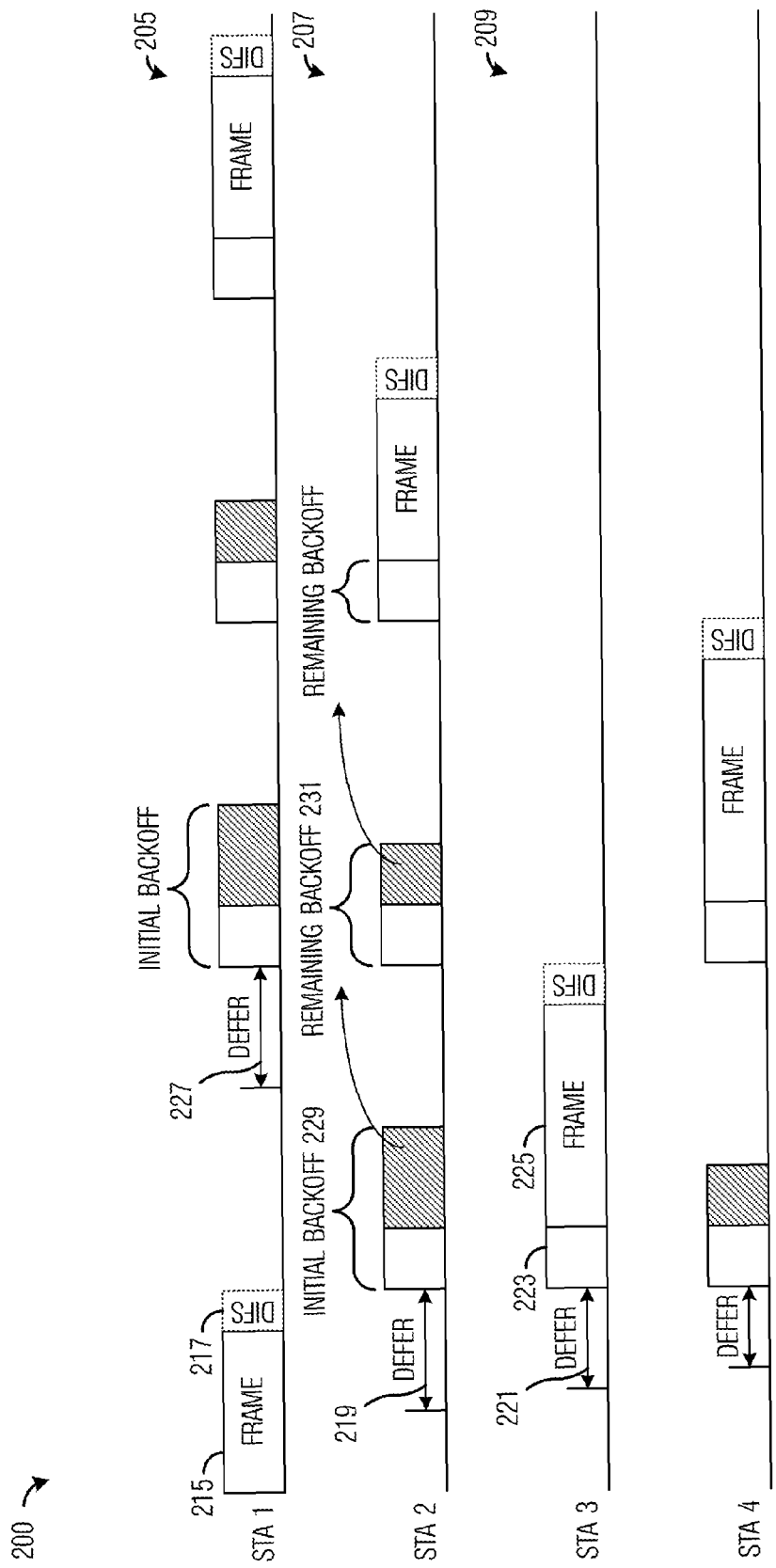
FIG. 2 illustrates an example diagram of channel access timing in accordance with an embodiment.

FIG. 2 illustrates a diagram 200 of example channel access timing. A first trace 205 represents channel access for a first station (STA 1), a second trace 207 represents channel access for a second station (STA 2), and a third trace 209 represents channel access for a third station (STA 3). As shown in FIG. 2, a short inter-frame space (SIFS) has a duration of 16 microseconds, a point coordination function (PCF) inter-frame space (PIFS) has a duration of 25 microseconds, while a DIFS may last longer than either the SIFS or the PIFS. A backoff period may be a random duration. Therefore, active scanning may not provide the best solution when there are large numbers of stations attempting to perform AP/network discovery.

STA 1 transmits a frame 215 and then waits for a DIFS. STA 2 has a frame to transmit but when it senses the wireless channel, it detects that the wireless channel is busy and defers for a random duration 219. Similarly, STA 3 also has a frame to transmit but it too senses that the wireless channel is busy, so it defers for a random duration 221. After STA 1 completes the transmission of frame 215 and the DIFS, STA 2 and STA 3 detects that the wireless channel as idle and perform initial backoffs of random durations (shown as initial backoff 229 for STA 2 and interval 223 for STA 3). Interval 223 of STA 3 completes while STA 2 is still performing its initial backoff and STA 3 is able to obtain access to the wireless channel and transmits frame 225 and then waits for a DIFS. STA 1 has another frame to transmit but when it senses the wireless channel, it detects that the wireless channel is busy and defers for a random duration 227. After STA 3 transmits frame 225 and the DIFS, STA 1 and STA 2 detects that the wireless channel is idle and perform initial backoffs of random durations (shown as initial backoff for STA 1 and remaining backoff 231 for STA 2). Clearly, the channel access technique using in WLAN is complex and the probability of obtaining access decreases rapidly with increasing number of contending stations.

In addition to the complexity involved with wireless channel contention, hidden nodes also cause a significant problem with transmission collisions, which cause substantial problems arising from damaged frames and extended recovery techniques. Generally, in a crowded wireless communications system, most transmission collisions are caused by hidden nodes.

Figure 3:
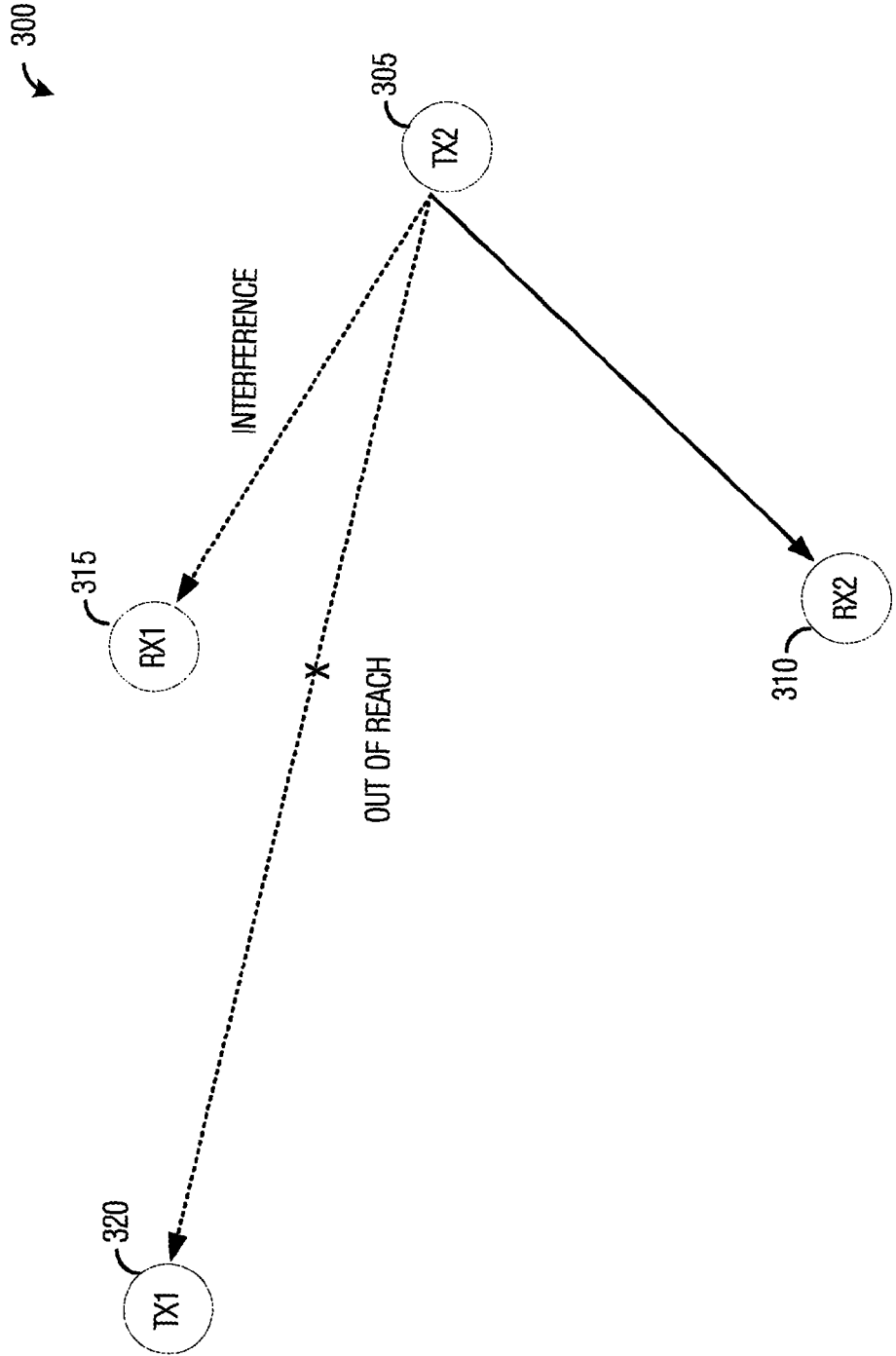
FIG. 3 illustrates a portion of an example wireless communications system highlighting transmission collisions arising from a hidden node in accordance with an embodiment.

FIG. 3 illustrates a portion of an example wireless communications system 300 highlighting transmission collisions arising from a hidden node. As shown in FIG. 3, a station TX2 305 is transmitting a frame to a station RX2 310. However, the frame transmission poses a significant source of interference to a station RX1 315. Due to factors, such as pathloss, the transmission from TX2 305 to RX2 310 is out of reach of TX1 320. Since TX1 320 is not able to detect the transmission from TX2 305 to RX2 310, TX1 320 may consider the wireless channel to be idle and commence its transmission to RS1 315, for example. Therefore, if TX1 320 transmits to RX1 315 while TX2 305 is transmitting to RX2 310, interference from TX2 305 may cause RX1 315 to not be able to decode the frame transmitted by TX1 320. Hence, in wireless communications system 300, TX1 320 is a hidden node to TX2 305 and vice versa.

Request to Send (RTS)/Clear to send (CTS) is a technique that helps to avoid hidden nodes. A sending station with frames to transmit may first broadcast a RTS frame indicating that it will send frames to a specified receiving station for a specified duration. After receiving the RTS frame, the specified receiving station may broadcast a CTS frame to confirm the sending station's transmission. Other stations that receive either the RTS or the CTS will not transmit their own frames until the end of the indicated duration. By following the RTS/CTS technique, transmission collisions may be avoided.

Figure 4A:
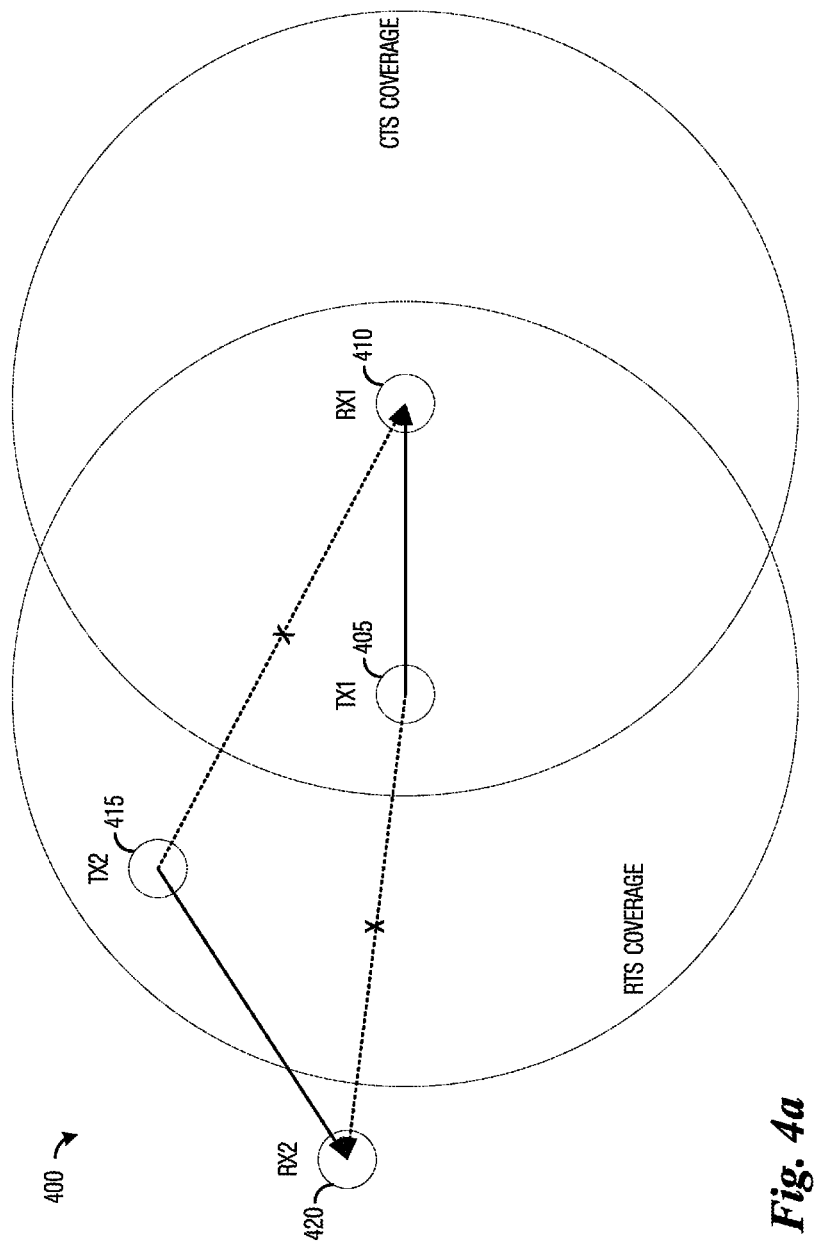
FIG. 4*a* illustrates a portion of an example wireless communications system highlighting the conservative nature of RTS/CTS in accordance with an embodiment.

RTS/CTS may tend to be conservative in its protection of the wireless channel. FIG. 4a illustrates a portion of an example wireless communications system 400 highlighting the conservative nature of RTS/CTS. As shown in FIG. 4a, although a transmission by TX1 405 to RX1 410 will not interfere with a reception of a transmission by TX2 415 to RX2 420 and the transmission by TX2 415 to RX2 420 will not interfere with the reception of the transmission by TX1 405 to RX1 410 when RTS/CTS is used, TX2 415 is not permitted to transmit at all for the entirety of the indicated duration of the RTS/CTS frame for TX1 405 and RX1 410 although the transmission of TX2 415 is incapable of reaching (and therefore causing interference to) RX1 410 (similarly, a transmission from TX1 405 is incapable of reaching (and therefore causing interference to) RX2 420).

Figure 4B:
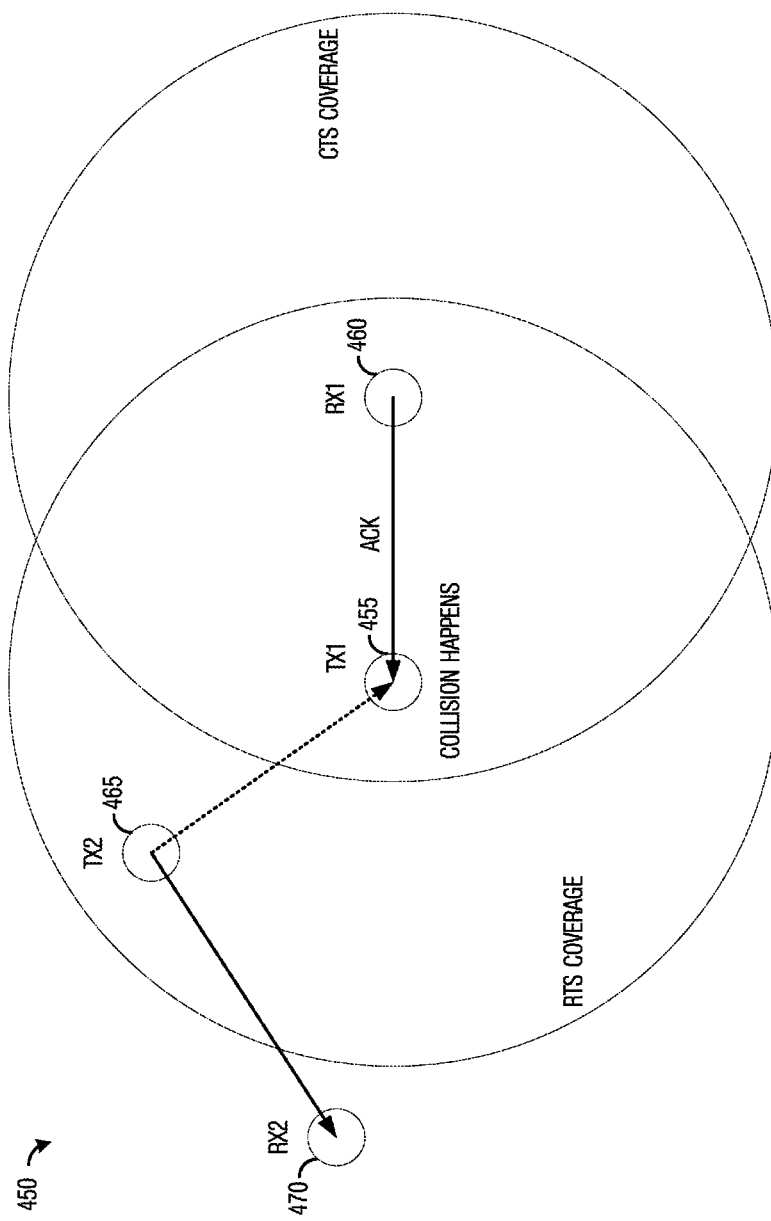
FIG. 4b illustrates a portion of an example wireless communications system highlighting a frame transmission collision in accordance with an embodiment.

The conservative nature of RTS/CTS is inherent in its design. FIG. 4b illustrates a portion of an example wireless communications system 450 highlighting a frame transmission collision. In general, the conservative nature of RTS/CTS is due to its protection of frame transmissions as well as frame receptions. As shown in FIG. 4b, since TX1 455 may also receive frames as well as transmit frames, RTS/CTS is designed to protect both frame transmissions and frame receptions. If TX1 455 transmits a frame to RX1 460, RX1 460 may send an acknowledgement frame back to TX1 455 upon successful reception of the frame from TX1 455. Therefore, if TX2 465 is also transmitting a frame to RX2 470 while TX1 455 is receiving the acknowledgement frame from RX1 460, the frame transmission from TX2 465 may interfere (or collide) with the reception of the acknowledgement frame at TX1 455.

According to an example embodiment, a transmitting station may have frames to transmit to a receiving station without expecting to receive a frame from the receiving station. In such situations, it may be possible to relax the protection provided by RTS/CTS to improve wireless channel efficiency while maintaining compatibility with legacy stations with small frame format changes.

According to an example embodiment, RTS/CTS may be modified to allow an additional mode of transmission with an acknowledgement policy of no acknowledgement (i.e., transmission only), meaning that the receiving station does not transmit during the transmission period of the transmitting station. The transmission period may be reserved by the transmitting station by transmitting a RTS, and may be reserved for as long as needed for the transmitting station to transmit its frames (or for as long as a transmitting station is permitted to reserve the wireless channel). The receiving station may transmit an acknowledgement frame outside of the transmission period. The receiving station may transmit a block acknowledgement that acknowledges the reception of frames transmitted in the transmission period rather than individual acknowledgements for each frame transmitted in the transmission period, for example.

Figure 5:
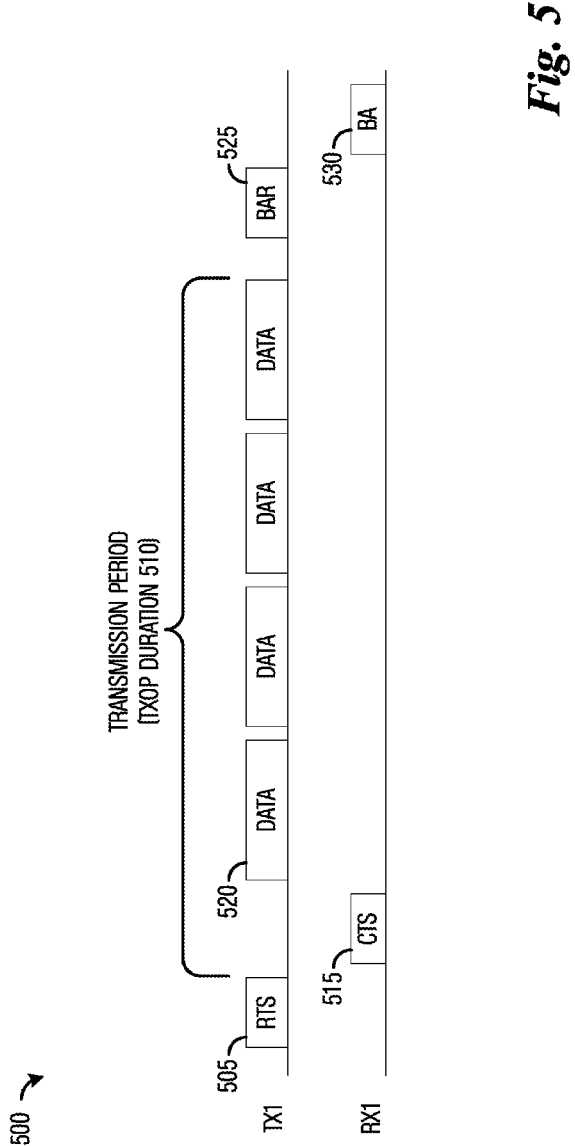
FIG. 5 illustrates an example transmission timing diagram for a transmitting station and a receiving station in accordance with an embodiment.

FIG. 5 illustrates an example transmission timing diagram 500 for a transmitting station and a receiving station. Transmission timing diagram 500 displays transmissions from a transmitting station (TX1) and a receiving station (RX1) as a function of time. At a first time, TX1 transmits a RTS frame 505 addressed to RX1. It is noted that RTS frame 505 may be addressed to a single receiving station (e.g., RX1) or one or more groups of receiving stations. RTS frame 505 may include a request for a transmission only transmission period of a specified duration (shown as TXOP duration 510). RX1 upon receiving RTS frame 505 and determining that RTS frame 505 is addressed to RX1 may transmit a CTS frame 515 to TX1. Other stations in the wireless communications system that detect RTS frame 505 may be able to determine that they are not the intended recipient of RTS frame 505 may not need to set their respective NAV as busy for the duration of the transmission period.

In the transmission period, TX1 can freely transmit as many frames as it can to RX1, such as frame 520. Since the transmission period is transmit only, TX1 does not receive any acknowledgements from RX1. Once the transmission period is over, TX1 may transmit a block acknowledgement request (BAR) 525 to RX1 and RX1 may transmit a block acknowledgement (BA) 530 to TX1. BA 530 may include acknowledgement information for the frames received by RX1 during the transmission period. BA 530 may be a single value indicating that all frames were received successfully. BA 530 may be a bitmap with each bit representing a single frame (with the bits position being representative of the order of the frame as transmitted) and the value of each bit representing if RX1 successfully (or unsuccessfully) received the frame.

According to an example embodiment, a RTS frame is modified to include a transmission only (TX-only) indication. If the TX-only indication is NOT set (i.e., the TX-only indication is set to a first value, e.g., 0, representing it being NOT set), the RTS frame (as well as its transmitting station and receiving station(s)) operates as it does in conventional RTS/CTS. If the TX-only indication is set (i.e., the TX only indication is set to a second value, e.g., 1, representing it being set), the RTS frame operates as follows:

After receiving a corresponding CTS frame, the transmitting station of the RTS frame transmits frames without receiving any frame during a period indicated by a duration field in the RTS frame (i.e., the transmission period);

The duration field in the RTS frame gives exclusive channel access right to the transmitting station if the TX-only indication is set. In other words, the RTS frame does not give the transmitting station exclusive right to the wireless channel for the duration of the transmission period since other stations may transmit for the duration of the transmission period; and Stations that receive the RTS frame but whose address is not included in a receiver address (RA) field of the RTS frame do not need to set their respective NAV to busy during the transmission period unless they receive the CTS frame following the RTS frame.

It is noted that although the discussion focusses on a single receiving station having its address in the RA field of the RTS frame, in practice, the RA field may include a plurality of receiving station addresses, an address of a group of stations, and the like. Therefore, the discussion of a single receiving station should not be construed as being limiting to either the scope or the spirit of the example embodiments. Additionally, the discussion focusses on a single wireless channel. However, the example embodiments presented herein are operable with any number of wireless channels, such as 1, 2, 3, 4, and so on. Therefore, the discussion of a single wireless channel should not be construed as being limiting to either the scope or the spirit of the example embodiments.

According to an example embodiment, a RTS frame that includes a TX-only indication may enable concurrent transmissions from multiple station, thereby improving wireless channel efficiency. Furthermore, backward compatibility is maintained so that legacy stations can still operate as normal. Additionally, very little frame format change is required.

According to an example embodiment, a RTS frame includes a TX-only indication. A transmitting station may set the TX-only indication for a variety of reasons, including:
 The transmitting station has more frames to transmit than typically allowed during a maximum transmission period (TXOP duration);
 Multiple APs belong to a single network operator and the APs try to share the wireless channels as much as possible, such as in coordinating downlink (DL) and/or uplink (UL) transmission time with adjacent APs; and
 May provide benefits with stations that it shares its transmission period with others, such as a longer maximum allowed transmission period if it shares its transmission period with other stations.

A receiving station that receives a RTS frame that includes a TX-only indication that is set and its address is included in the RA field of the RTS frame may reply with a CTS frame within a SIFS time; and after sending the CTS frame, the receiving station is not allowed to transmit any frames to the transmitting station of the RTS frame until the end of the transmission period (TXOP duration).

A receiving station that receives a RTS frame that includes a TX-only indication that is set and its address is not included in the RA field of the RTS frame may perform a variety of operations, including:
 The receiving station may monitor the wireless channel and determine if a CTS frame follows;
 If the receiving station decodes a CTS frame within a SIFS time, the receiving station sets its NAV and is not allowed to transmit until the end of the transmission period (the indication duration period);
 If the receiving station does not decode a correct (corresponding) CTS frame within a SIFS time, it can initiate its own transmission. However, until the end of the transmission period (as indicated by the RTS frame) since the transmission station of the RTS frame is likely transmitting its own frames that may interfere with the reception of frames at the receiving station, the receiving station should not allow frame reception from other stations;
 The receiving station may perform a clear channel assessment (CCA)
  In normal operation, during the CCA process, if the wireless channel is busy, the receiving station is not allowed to transmit,
  However, with a RTS frame with a TX-only indication that is set, even if the wireless channel is busy, the receiving station may, for the duration of the transmission period, transmit a frame if the wireless channel is currently occupied by a frame transmitted by the transmitting station of the RTS frame. If the frame is transmitted by another station, the receiving station may not transmit a frame,
  The receiving station may verify the source of a frame currently occupying the wireless channel by monitoring a physical layer (PHY) header part of the frame and check to determine if the address information, such as a partial association identity (AID), of the frame matches with that shown in the RA field of the RTS frame.

According to an example embodiment, when a transmitting station transmits a RTS frame with the TX-only indication set, the receiving stations that understand the TX-only indication may prepare for concurrent transmission. However, for receiving stations that do not understand the TX-only indication may set their respective NAV to the proper value and are not allowed to access the wireless channel. Therefore, there is a need to define the RTS format so that legacy stations that do not understand the TX-only indication will still set their respective NAV to the proper value. It may be possible to use reserved bits in the RTS format as the TX-only indication. Therefore, to legacy stations, a RTS frame with the TX-only indication appears like a RTS frame without the TX-only indication.

Figure 6A:
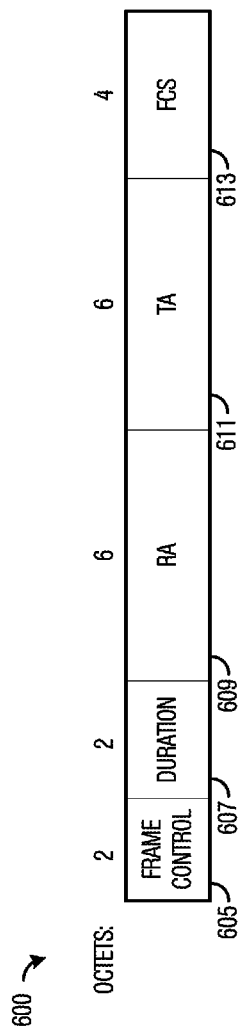
FIG. 6a illustrates an example RTS frame in accordance with an embodiment.

FIG. 6a illustrates an example RTS frame 600. RTS frame 600 includes a two-byte frame control field 605 that includes, amongst other things, a TX-only indication. One or more of the bits in frame control field 605 may be used to represent the TX-only indication with a first combination of value(s) of the bit(s) being used to represent the TX-only indication being set and a second combination of value(s) of the bit(s) being used to represent the TX-only indication being not set. RTS frame 600 also includes a duration field 607 that specifies the transmission period (the TXOP duration), a RA field 609 that specifies receiving stations or groups of receiving stations of RTS frame 600, a TA field 611 that specifies an address of the transmitting station of RTS frame 600, and a frame check sequence (FCS) field 613 that includes an error check.

Figure 6B:
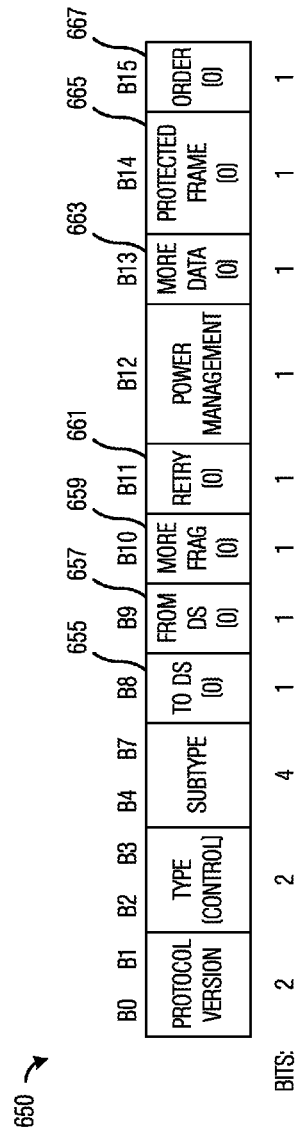
FIG. 6b illustrates a detailed view of an example frame control field of a RTS frame in accordance with an embodiment.

FIG. 6b illustrates a detailed view of an example frame control field 650 of a RTS frame. Frame control field 650 may be used to convey a TX-only indication in the RTS frame. Some of the fields in frame control field 650 of the RTS frame may be unused and may be set to 0, including fields TO DS 665, FROM DS 667, MORE FRAG 659, RETRY 661, MORE DATA 663, PROTECTED FRAME 665, and ORDER 667. Additionally, in the current IEEE 802.11ac technical standards, MORE DATA 663 is set to 1 in individually addressed frames transmitted by a very high throughput (VHT) AP to a VHT station when both support a TXOP power save feature to indicate that at least one additionally buffered buffer unit (BU) is present for the VHT station. Hence, any of the other unused bits (TO DS 665, FROM DS 667, MORE FRAG 659, RETRY 661, PROTECTED FRAME 665, and ORDER 667, for example) or a combination thereof may be used for the TX-only indication. As an illustrative example, FROM DS 667 being set to 0 may indicate that TX-only is not set, while 1 may indicate that TX-only is set. Other examples using the other fields shown above may be used. Additionally, more than one bit (i.e., multiple fields) may be used for the TX-only indication.

Figure 7:
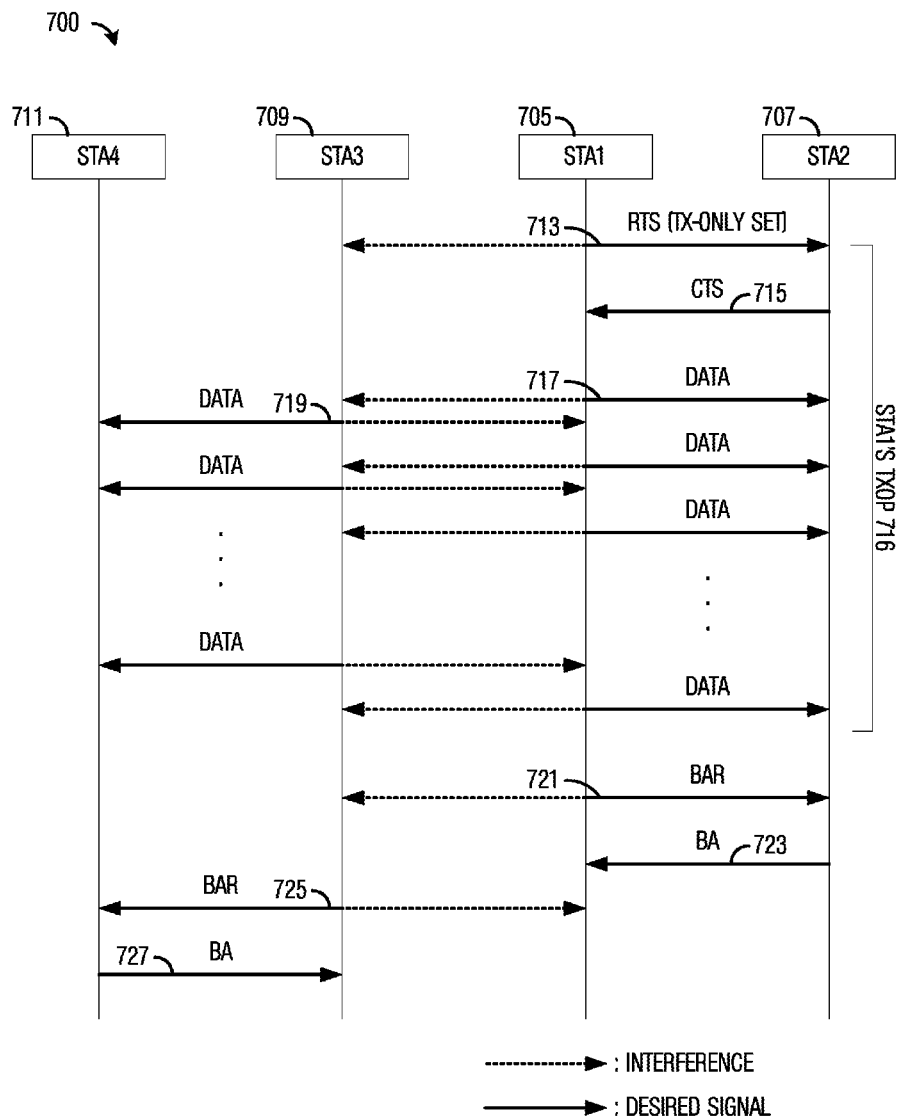
FIG. 7 illustrates an example message exchange diagram highlighting concurrent transmission supported by a RTS frame with a TX-only indication in accordance with an embodiment.

FIG. 7 illustrates an example message exchange diagram 700 highlighting concurrent transmission supported by a RTS frame with a TX-only indication. Message exchange diagram 700 includes frames transmitted by STA1 705, STA2 707, STA3 709, and STA4 711. In addition to transmitting frames to intended recipients, the transmitted frames also appear as interference to closely located stations. Actual transmissions are shown as solid arrows and transmissions as interference are shown as dashed arrows.

STA1 705 may transmit a RTS frame with TX-only set to STA2 707 (shown as event 713). The RTS frame is also detectable by STA3 709. STA2 707 replies to the RTS frame with a CTS frame (shown as event 715). STA1 705 has confirmation of its transmission period (TXOP duration, shown as STA1'S TXOP 716). However, STA3 709 is not able to detect the CTS transmitted by STA2 707 so it can perform concurrent transmission for the duration of the transmission period of STA1 705 (STA1'S TXOP 716). Therefore, during the transmission period (STA1'S TXOP 716), while STA1 705 is transmitting frames such as shown as event 717, STA3 709 can also transmit frames to STA4 711 (shown as event 719, for example).

After the transmission period of STA1 705 ends, STA1 705 may transmit a BAR to STA2 707 (shown as event 721). In response, STA2 707 transmits a BA to STA1 705 (shown as event 723). It is noted that during the transmission of the BAR and the BA, STA1 705 and then STA2 707 have exclusive access of the wireless channel so other stations cannot transmit. STA3 also transmits a BAR to STA4 711 (shown as event 725) and STA4 711 responds with a BA to STA3 701 (shown as event 727) after STA1 05 and STA2 707 have completed their transmissions.

Figure 8A:
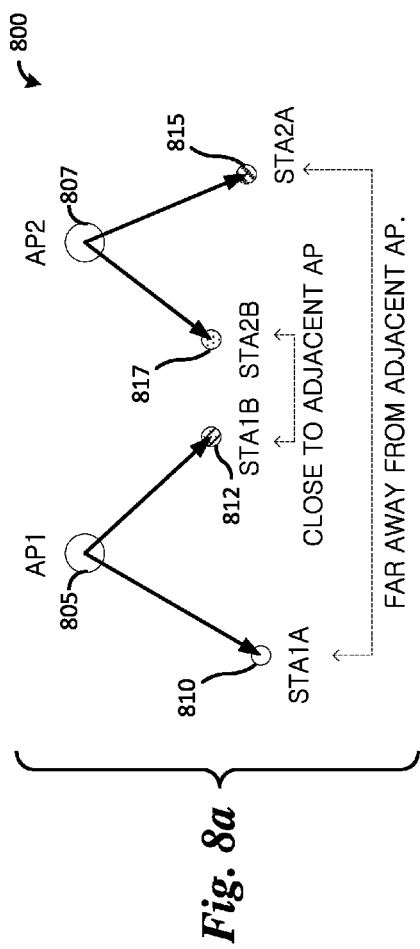
FIG. 8a illustrates an example wireless communications system that makes use of RTS frames with TX-only indications in accordance with an embodiment.
Figure 8B:
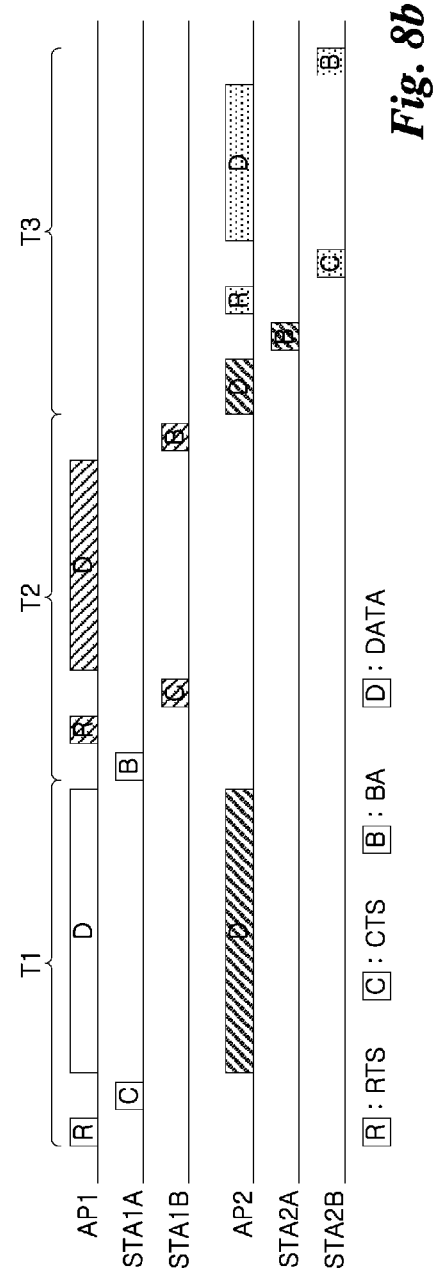
FIG. 8b illustrates an example timing diagram highlighting operation of a wireless communications system that makes use of RTS frames with TX-only indications in accordance with an embodiment.

FIG. 8a illustrates an example wireless communications system 800 that makes use of RTS frames with TX-only indications. Wireless communications system 800 includes AP1 805 and AP2 807. Both AP1 805 and AP2 807 belong to a single operator's communications system and their channel access is coordinated with each other (e.g., by message passing or a network entity that is coupled to both) so that their transmissions are coordinated. As an example, in a first duration T1, AP1 805 and AP2 807 transmit simultaneously DL frames to their own stations (e.g., STA1A 810 and STA1B 812 for AP1 805 and STA2A 815 and STA2B 817 for AP2 807) that are geographically separated from each other using RTS frames with TX-only indications. While at a second duration T2, only AP1 805 may transmit, and at a third duration T3, only AP2 807 may transmit. Therefore, during the first duration, AP1 805 sends frames to STA1A 810 and AP2 807 sends frames to STA2A 815 where STA1A 810 and STA2A 815 are far enough apart so that their respective transmissions do not cause interference, then in the second duration and the third duration, AP1 805 and AP2 807 can transmit frames to their respective stations. FIG. 8b illustrates an example timing diagram 850 highlighting operation of a wireless communications system that makes use of RTS frames with TX-only indications.

Figure 9:
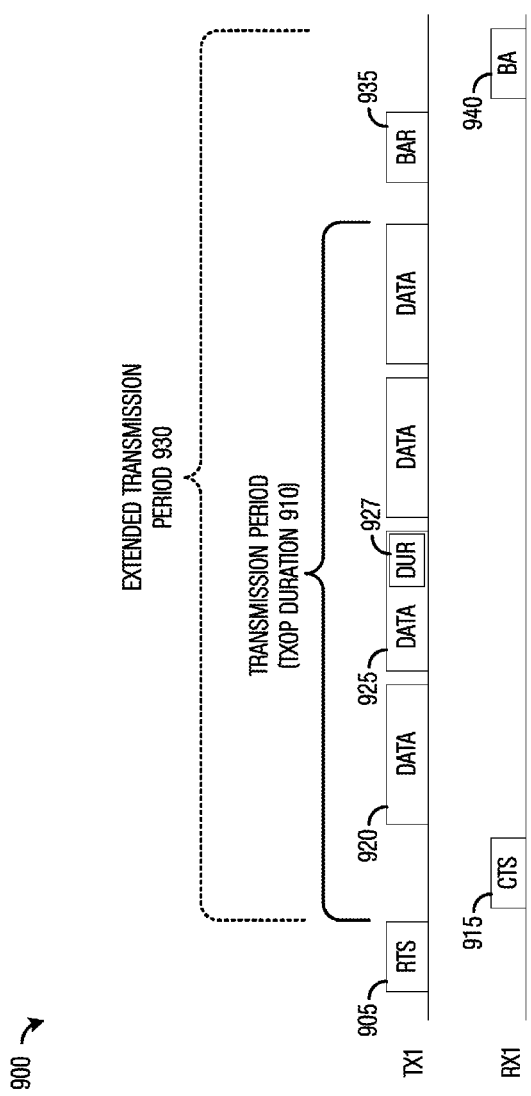
FIG. 9 illustrates an example transmission timing diagram for a transmitting station and receiving station pair, highlighting an extended transmission period accordance with an embodiment.

FIG. 9 illustrates an example transmission timing diagram 900 for a transmitting station and receiving station pair, highlighting an extended transmission period. Transmission timing diagram 900 displays transmissions from a transmitting station (TX1) and a receiving station (RX1) as a function of time. At a first time, TX1 transmits a RTS frame 905 addressed to RX1. It is noted that RTS frame 905 may be addressed to a single receiving station (e.g., RX1) or one or more groups of receiving stations. RTS frame 905 may include a request for a transmission only transmission period of a specified duration (shown as TXOP duration 910). RX1 upon receiving RTS frame 905 and determining that RTS frame 905 is addressed to RX1 may transmit a CTS frame 915 to TX1. Other stations in the wireless communications system that detect RTS frame 905 may be able to determine that they are not the intended recipient of RTS frame 905 may not need to set their respective NAV as busy for the duration of the transmission period.

In the transmission period, TX1 can freely transmit as many frames as it can to RX1, such as frame 920, and the like. Since the transmission period is transmit only, TX1 does not receive any acknowledgements from RX1. In one or more of the frames transmitted by TX1 during the transmission period, e.g., frame 925, may include a duration field, e.g., duration field 927, which specifies not only TXOP duration 910 but durations for possible acknowledgements. The duration in duration field 927 specifies an extended transmission period 930. More than one frame transmitted during the transmission period may include duration fields. Other stations that receive RTS 905 may examine frames transmitted in TXOP duration 910 to identify extended transmission period 930. The other stations may be able to identify not only TXOP duration 910, but additional time used in request and transmission of the block acknowledgements. The other stations may also be able to initiate simultaneous transmissions in the additional time. Once the transmission period is over, TX1 may transmit a block acknowledgement request (BAR) 935 to RX1 and RX1 may transmit a block acknowledgement (BA) 940 to TX1.

Figure 10:
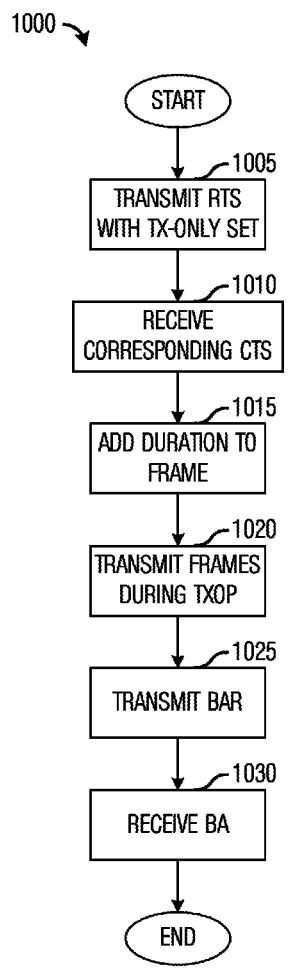
FIG. 10 illustrates a flow diagram of example operations occurring in a transmitting station in accordance with an embodiment.

FIG. 10 illustrates a flow diagram of example operations 1000 occurring in a transmitting station. Operations 1000 may be indicative of operations occurring in a transmitting station, such as an AP or a station, as the transmitting station operates in a transmit only mode.

Operations 1000 may begin with the transmitting station transmitting a RTS with the TX-only indication set (block 1005). The RTS frame may be address to a single receiving station, multiple stations, a station group, or multiple station groups. The transmitting station receives a corresponding CTS frame (block 1010). If the transmitting station wants to add additional time to the TXOP for acknowledgement transmission, the transmitting station may add a duration field to one or more of the frames that it transmits during the TXOP (block 1015) The transmitting station may transmit frames during the TXOP (block 1020). Once the TXOP expires, the transmitting station may transmit a BAR (block 1025) and receive a BA (block 1030). It is noted that the TXOP in this situation is the original TXOP requested by the transmitting station in the RTS frame.

Figure 11:
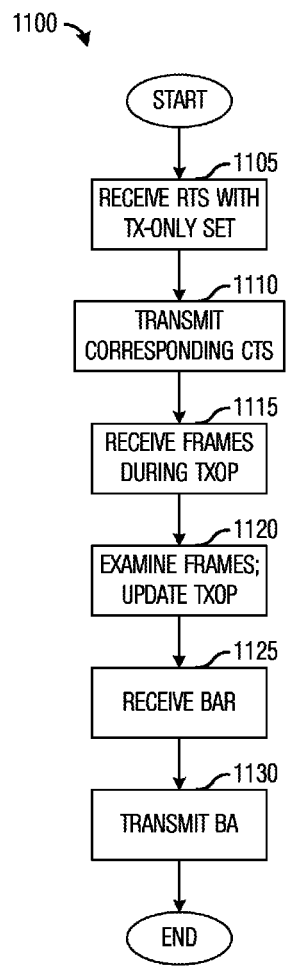
FIG. 11 illustrates a flow diagram of example operations occurring in a receiving station in accordance with an embodiment.

FIG. 11 illustrates a flow diagram of example operations 1100 occurring in a receiving station. Operations 1100 may be indicative of operations occurring in a receiving station, such as a station or an AP, as the receiving station operates in a transmit only mode.

Operations 1100 may begin with the receiving station receiving a RTS frame with the TX-only indication set from a transmitting station (block 1105). The receiving station may send a CTS frame if it is addressed in the RTS frame (block 1110). The receiving station may receive frames from the transmitting station (block 1115). The receiving station may examine the frames for duration fields. If there are duration fields in one or more frames, the receiving station may update the TXOP (block 1120). After the TXOP ends, the receiving station may receive a BAR (block 1125) and send a BA (block 1130).

Figure 12:
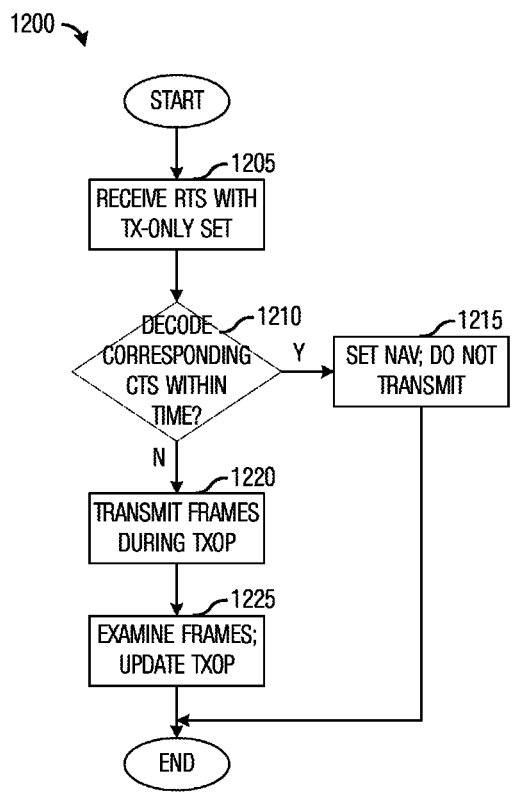
FIG. 12 illustrates a flow diagram of example operations occurring in a sharing station in accordance with an embodiment.

FIG. 12 illustrates a flow diagram of example operations 1200 occurring in a sharing station. Operations 1200 may be indicative of operations occurring in a sharing station, such as an AP or a station, as the sharing station shares a wireless channel with a transmitting station operating in a transmit only mode.

Operations 1200 may begin with the sharing station receiving a RTS frame with the TX-only indication set from a transmitting station (block 1205). The sharing station may perform a check to determine if it receives a corresponding CTS frame within a time limit, e.g., a SIFS time (block 1210). If the sharing station receives the corresponding CTS frame, the receiving station sets its NAV and is not allowed to transmit until the end of the TXOP (block 1215).

If the sharing station does not receive the corresponding CTS frame, the sharing station may transmit its own frames during the TXOP (block 1220). The sharing station may also examine frames that it receives from the transmitting station and if it finds duration fields, the sharing station may update the TXOP (block 1225).

Figure 13:
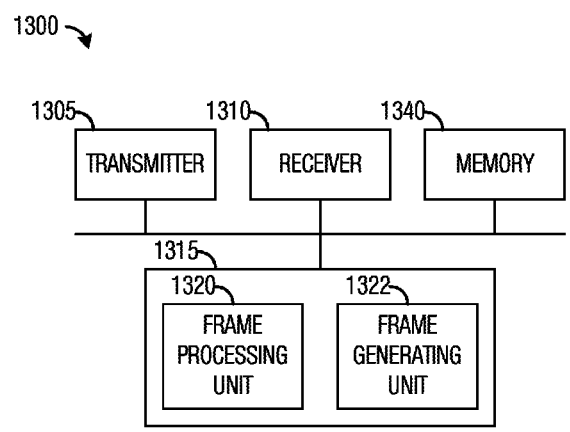
FIG. 13 illustrates a first example communications device in accordance with an embodiment.

FIG. 13 illustrates a first example communications device 1300. Communications device 1300 may be an implementation of a receiving station, such as an AP or a station, or a sharing station, such as an AP or a station. Communications device 1300 may be used to implement various ones of the embodiments discussed herein. As shown in FIG. 13, a transmitter 1305 is configured to transmit frames, CTS frames, BAs, and the like. Communications device 1300 also includes a receiver 1310 that is configured to receive frames, RTS frames, BARs, and the like.

A frame generating unit 1320 is configured to generate CTS frames, BAs, and the like. A frame processing unit 1322 is configured to process received frames. Frame processing unit 1322 is configured to process RTS frames, data frames, data frames with duration fields, BARs, and the like. A memory 1340 is configured to store RTS frames, CTS frames, frames, NAV, acknowledgements, and the like.

The elements of communications device 1300 may be implemented as specific hardware logic blocks. In an alternative, the elements of communications device 1300 may be implemented as software executing in a processor, controller, application specific integrated circuit, or so on. In yet another alternative, the elements of communications device 1300 may be implemented as a combination of software and/or hardware.

As an example, receiver 1310 and transmitter 1305 may be implemented as a specific hardware block, while frame generating unit 1320, and frame processing unit 1322 may be software modules executing in a microprocessor (such as processor 1315) or a custom circuit or a custom compiled logic array of a field programmable logic array. Frame generating unit 1320 and frame processing unit 1322 may be modules stored in memory 1340.

Figure 14:
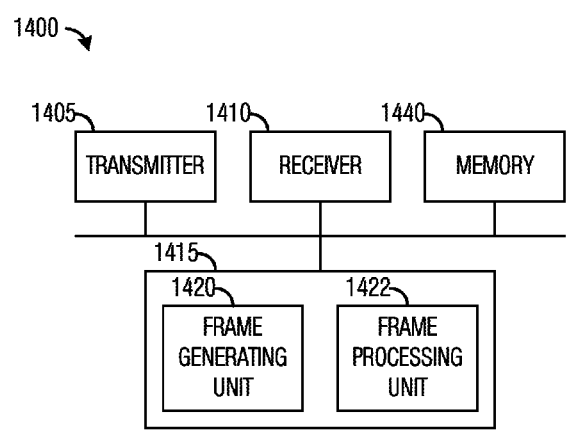
FIG. 14 illustrates a second example communications device in accordance with an embodiment

FIG. 14 illustrates a second example communications device 1400. Communications device 1400 may be an implementation of a transmitting station, such as an AP or a station. Communications device 1400 may be used to implement various ones of the embodiments discussed herein. As shown in FIG. 14, a transmitter 1405 is configured to transmit frames, RTS frames, BARs, and the like. Communications device 1400 also includes a receiver 1410 that is configured to receive frames, CTS frames, BAs, and the like.

A frame generating unit 1420 is configured to generate RTS frames, RTS frames with the TX-only indicator set, data frames, data frames with duration fields, and the like. A frame processing unit 1422 is configured to process received frames. Frame processing unit 1422 is configured to process CTS frames, BAs, and the like. A memory 1440 is configured to store RTS frames, CTS frames, frames, NAV, acknowledgements, and the like.

The elements of communications device 1400 may be implemented as specific hardware logic blocks. In an alternative, the elements of communications device 1400 may be implemented as software executing in a processor, controller, application specific integrated circuit, or so on. In yet another alternative, the elements of communications device 1400 may be implemented as a combination of software and/or hardware.

As an example, receiver 1410 and transmitter 1405 may be implemented as a specific hardware block, while frame generating unit 1420, and frame processing unit 1422 may be software modules executing in a microprocessor (such as processor 1415) or a custom circuit or a custom compiled logic array of a field programmable logic array. Frame generating unit 1420 and frame processing unit 1422 may be modules stored in memory 1440.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for operating a sharing station, the method comprising:
   receiving, by the sharing station, a request to send (RTS) frame on a wireless channel, wherein the RTS frame is not addressed to the sharing station, and wherein the RTS frame includes a transmit only indicator indicating that a transmitting station of the RTS frame will only transmit frames without receiving frames until expiration of a first time value in a first duration field of the RTS frame;
   determining, by the sharing station, if a clear to send (CTS) frame corresponding to the RTS frame is received within a specified time period after receiving the RTS frame; and
   transmitting, by the sharing station, a data frame when the CTS frame corresponding to the RTS frame is not received within the specified time period, wherein the data frame is transmitted prior to expiration of the first time value in the first duration field of the RTS frame.

2. The method of claim 1, wherein the data frame is transmitted if the wireless channel is accessible.

3. The method of claim 2, wherein the wireless channel is accessible if at least one of the wireless channel is idle and the wireless channel is occupied by the transmitting station is true.

4. The method of claim 1, wherein the transmit only indicator comprises at least one bit in a frame control field of the RTS frame.

5. The method of claim 4, wherein the at least one bit comprises at least one of a TO DS bit, a FROM DS bit, a MORE FRAG bit, a RETRY bit, a MORE DATA bit, a PROTECTED frame bit, and an ORDER bit.

6. The method of claim 1, wherein the specified time period comprises a short inter-frame space (SIFS) duration.

7. The method of claim 1, further comprising transmitting a plurality of frames until expiration of the first time value in the first duration field of the RTS frame.

8. The method of claim 1, further comprising disallowing reception of frames from other stations.

9. The method of claim 1, further comprising receiving a data frame comprising a second duration field from the transmitting station prior to expiration of the first time value in the first duration field of the RTS frame, and wherein the frame is transmitted prior to expiration of a second time value in the second duration field of the data frame.

10. A method for operating a receiving station, the method comprising:
   receiving, by the receiving station, a request to send (RTS) frame on a wireless channel, wherein the RTS frame is addressed to the receiving station, and wherein the RTS frame includes a transmit only indicator indicating that a transmitting station of the RTS frame will only transmit frames without receiving frames until expiration of a first time value in a first duration field of the RTS frame, wherein the transmit only indicator comprises at least one bit in a frame control field of the RTS frame, and wherein the frame control field is different from the first duration field;

transmitting, by the receiving station, a clear to send (CTS) frame on the wireless channel;

receiving, by the receiving station, a plurality of frames from the transmitting station of the RTS frame prior to expiration of the first time value in the first duration field of the RTS frame;

receiving, by the receiving station, a block acknowledgement request frame from the transmitting station after expiration of the first time value in the first duration field of the RTS frame; and transmitting, by the receiving station, a block acknowledgement frame to the transmitting station, wherein the block acknowledgement frame is reflective of decoding attempts of the plurality of frames.

11. The method of claim 10, wherein a frame of the plurality of frames comprises a second duration field including a second time value that is sufficient for receiving the block acknowledgement request frame and transmitting the block acknowledgement frame.

12. A method for operating a transmitting station, the method comprising:

transmitting, by the transmitting station, a request to send (RTS) frame on a wireless channel, wherein the RTS frame is addressed to a receiving station, and wherein the RTS frame including a transmit only indicator indicating that the transmitting station will only transmit frames without receiving frames until expiration of a first time value in a first duration field of the RTS frame, wherein the transmit only indicator comprises at least one bit in a frame control field of the RTS frame, and wherein the frame control field is different from the first duration field;

receiving, by the transmitting station, a clear to send (CTS) frame from the receiving station;

transmitting, by the transmitting station, a plurality of frames prior to expiration of the first time value in the first duration field of the RTS frame;

transmitting, by the transmitting station, a block acknowledgement request frame after expiration of the first time value in the first duration field of the RTS frame; and receiving, by the transmitting station, a block acknowledgement frame from the receiving station, wherein the block acknowledgement frame is reflective of decoding attempts of the plurality of frames by the receiving station.

13. The method of claim 12, wherein a frame of the plurality of frames comprises a second duration field including a second time value that is sufficient for transmitting the block acknowledgement request frame and receiving the block acknowledgement frame.

14. A sharing station comprising:

a receiver configured to receive a request to send (RTS) frame on a wireless channel, wherein the RTS frame is addressed to a station different from the sharing station, and wherein the RTS frame includes a transmit only indicator indicating that a transmitting station of the RTS frame will only transmit frames without receiving frames until expiration of a first time value in a first duration field of the RTS frame;

a processor operatively coupled to the receiver, the processor configured to determine if a clear to send (CTS) frame corresponding to the RTS frame is received within a specified time period after receiving the RTS frame; and a transmitter operatively coupled to the processor, the transmitter configured to transmit a data frame when the CTS frame corresponding to the RTS frame is not received within the specified time period.

15. The sharing station of claim 14, wherein the transmitter is configured to transmit a plurality of frames until expiration of the first time value in the first duration field of the RTS frame.

16. The sharing station of claim 14, wherein the processor is configured to disallow reception of frames from other stations.

17. The sharing station of claim 14, wherein the transmitter is configured to transmit the frame prior to expiration of the first time value in the first duration field of the RTS frame.

18. The sharing station of claim 14, wherein the receiver is configured to receive a data frame comprising a second duration field from the transmitting station prior to expiration of the first time value in the first duration field of the RTS frame, and wherein the transmitter is configured to transmit the frame prior to expiration of a second time value in the second duration field of the data frame.

19. The sharing station of claim 14, wherein the transmitter is configured to transmit the frame if the wireless channel is accessible.

20. The sharing station of claim 19, wherein the wireless channel is accessible if at least one of the wireless channel is idle and the wireless channel is occupied by the transmitting station is true.

* * * * *